US008200668B2

(12) United States Patent
Carlin et al.

(10) Patent No.: US 8,200,668 B2
(45) Date of Patent: Jun. 12, 2012

(54) SCALAR REPRESENTATION FOR A LOGICAL GROUP OF COLUMNS IN RELATIONAL DATABASES

(75) Inventors: Peter Alan Carlin, Seattle, WA (US); Srinivasmurthy P. Acharya, Sammamish, WA (US); Jun Fang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/145,297

(22) Filed: Jun. 24, 2008

(65) Prior Publication Data

US 2009/0319487 A1 Dec. 24, 2009

(51) Int. Cl.
*G06F 17/30* (2006.01)

(52) U.S. Cl. ........ 707/737; 707/756; 707/790; 707/791; 707/802

(58) Field of Classification Search ................. 707/737, 707/713, 706, 705, 736, 711, 756, 790, 791, 707/802
See application file for complete search history.

(56) References Cited

U.S. PATENT DOCUMENTS

| | | | |
|---|---|---|---|
| 5,713,020 A | 1/1998 | Reiter et al. | |
| 6,061,690 A * | 5/2000 | Nori et al. | 1/1 |
| 6,122,644 A * | 9/2000 | Graefe et al. | 1/1 |
| 6,526,406 B1 * | 2/2003 | Suzuki et al. | 1/1 |
| 6,721,727 B2 | 4/2004 | Chau et al. | |
| 6,892,204 B2 * | 5/2005 | Haas et al. | 1/1 |
| 6,934,712 B2 | 8/2005 | Kiernan et al. | |
| 7,133,858 B1 | 11/2006 | Larson et al. | |
| 7,346,598 B2 | 3/2008 | Arora et al. | |
| 7,634,498 B2 * | 12/2009 | Pal et al. | 1/1 |
| 2003/0014397 A1 * | 1/2003 | Chau et al. | 707/3 |
| 2003/0236784 A1 * | 12/2003 | Tang et al. | 707/6 |
| 2004/0128306 A1 * | 7/2004 | Shanmugasundaram et al. | 707/102 |
| 2004/0153435 A1 * | 8/2004 | Gudbjartsson et al. | 707/1 |
| 2005/0091188 A1 * | 4/2005 | Pal et al. | 707/1 |
| 2005/0091256 A1 * | 4/2005 | Rathakrishnan et al. | 707/102 |
| 2005/0144163 A1 * | 6/2005 | Tang et al. | 707/3 |
| 2006/0020580 A1 * | 1/2006 | Dettinger et al. | 707/3 |
| 2006/0020582 A1 | 1/2006 | Dettinger et al. | |
| 2006/0129572 A1 * | 6/2006 | Cole et al. | 707/100 |
| 2006/0136415 A1 * | 6/2006 | Ramsey et al. | 707/7 |
| 2007/0027905 A1 * | 2/2007 | Warren et al. | 707/103 R |
| 2007/0150489 A1 | 6/2007 | Dettinger et al. | |
| 2008/0059492 A1 | 3/2008 | Tarin | |

OTHER PUBLICATIONS

Daniel J. Abadi, Column-Stores for Wide and Sparse Data, Jan. 10, 2007, pp. 1-6.*
Murthy et al., Towards an Enterprise XML Architecture, Jun. 16, 2005, pp. 1-5.*
Using Column Sets. In: SQL Server 2008 Books Online (Feb. 2008) http://msdn2.microsoft.com/en-us/library/cc280521(SQL. 100,printer).aspx. Last accessed Apr. 25, 2008, 5 pages.
NASH. Learn to Use XML with DB2 http://www.devx.com/getHelpOn/Article/11004/1954. Last accessed Apr. 25, 2008, 6 pages.

(Continued)

*Primary Examiner* — Sherief Badawi
(74) *Attorney, Agent, or Firm* — Zete Law, P.L.L.C.; MacLane C. Key (57) ABSTRACT

Systems and methods that group atomic scalar values recognized by a database such as columns into sets (e.g., column sets). A grouping component associated with the SQL server creates a logical representation for column groupings, which are accessible by a single I/O and can be co-located (e.g., substantially close or compact) in terms of storage location. Interesting column sets (e.g., non-null) can also be selected for a data representation thereof as a single entity to other applications.

20 Claims, 9 Drawing Sheets

OTHER PUBLICATIONS

ABADI. Colum•Stores for Wide and Sparse Data. In: 3rd Biennial Conference on Innovative Data Systems Research (CIDR) Jan. 7-10, 2007, Asilomar, California, USA. http://db.lcs.mit.edu/projects/cstore/abadicidr07.pdf. Last accessed Apr. 24, 2008, 6 pages.

* cited by examiner

SCALAR REPRESENTATION FOR A LOGICAL GROUP OF COLUMNS IN RELATIONAL DATABASES

BACKGROUND

Advent of a global communications network such as the Internet has facilitated exchange of enormous amounts of information. Additionally, costs associated with storage and maintenance of such information has declined, resulting in massive data storage structures. Hence, substantial amounts of data can be stored as a data warehouse, which is a database that typically represents business history of an organization. For example, such stored data is employed for analysis in support of business decisions at many levels, from strategic planning to performance evaluation of a discrete organizational unit. Such can further involve taking the data stored in a relational database and processing the data to make it a more effective tool for query and analysis.

Accordingly, it is important to store such data in a manageable manner that facilitates user friendly and quick data searches and retrieval. In general, a common approach is to store electronic data in a database. A database functions as an organized collection of information, wherein data is structured such that a computer program can quickly search and select desired pieces of data, for example. Commonly, data within a database is organized via one or more tables, and the tables are arranged as an array of rows and columns.

Moreover, such tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

In general, each individual piece of data, standing alone, is not very informative. Database applications allow the user to compare, sort, order, merge, separate and interconnect the data, so that useful information can be generated from the data. Moreover, capacity and versatility of databases have grown incredibly to allow virtually endless storage capacity by utilizing databases.

In such databases, selecting large number of columns require consuming significant resources on the client and server side of the machine. Representing objects that have large number of properties remain a challenging task. Moreover, there exist a number of customer segments that store heterogeneous, semi structured data in Structured Query Language (SQL) Server tables—wherein such semi-structured data includes groups of scalar, complex and collection properties that can be ordered, open, and heterogeneous.

For example a document/content management system similar to Windows® Sharepoint services, may store different types of user data in a single table. These tables by definition contain data that have different properties that apply to different subsets of rows in the table. In such cases, SQL Server tables contain columns that are populated with values for only a subset of rows in the table—(such as sparse columns with NULL values for most of the rows in the containing table)—though such subsets can vary from column to column. Also as new types of contents are added to the table, there can be employed to add new kinds of properties (columns) that apply to the new content type. Such can further introduce a requirement for frequently changing schema for the table as well as ability to define large number of columns in a table—which further add to the complexities involved.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation groups atomic scalar values recognized by a database such as columns into sets (e.g., column sets)—via a grouping component, wherein a column set represents column groups that can be treated as a single entity (e.g., on a client side). Accordingly, the grouping component can create a logical representation for column groupings, which are accessible by a single I/O and can be co-located (e.g., substantially close or compact) in terms of storage location. Moreover, the column set can further resemble a simple compact representation, such as a string representation, a binary representation, a single binary scalar, and the like for a set of columns, to increase operation efficiency for the database (e.g., insert, update, select, and the like.) Interesting column sets (e.g., non-null) can then be selected for a data representation thereof as a single entity to other applications.

In a related aspect, the grouping component can further include an aggregation component, a shredding component, and a metadata component. The aggregation component can obtain one or more columns and create a scalar representation therefrom. Likewise, the shredding component can take an incoming scalar representation and break such representation into one or more columns. The shredding component and the aggregation component can further employ the metadata component to identify columns that are part of the column set, to output a compact representation thereof. Accordingly, the metadata component can track which columns are part of which set (e.g., verifying type of properties and their existence)—wherein such shredding further facilitates shredding columns into a grouping set and from the grouping set into underlying individual columns. As such, the metadata component identifies columns that are part of the column set, and hence two processes are facilitated, one from shredded column in to the grouping set and the other from the grouping set into the underlying individual columns.

In a related methodology, group column matching can be defined by analyzing schema or metadata associated with the columns. Column sets or groupings can then be generated for a group of columns. Accordingly, such grouping acts as a single value that represents a compact encoding of data within a column set. For example, for a query that requires insert of rows into a table command, a requirement for parsing the plurality of columns is mitigated.

According to a further aspect, notion of a column set represents a conceptual/logical grouping of a number of columns in a relational table. The column set provides a scalar representation for such a logical group and can be queried and manipulated as a set, similar to a single scalar column. As such, the subject innovation supplies applications/users a scalar representation for grouping related columns together by extending SQL data definition language, and facilities querying and manipulating the column set as a group—while still maintaining the flexibility accessing underlying individual columns as needed. For example, a simple representation for a column set in SQL data definition language can include: <column set name> <scalar data type> COLUMN SET FOR (<list of member columns in the table>

Column set can be queried and manipulated using SQL query and data manipulation language similar to manipulating a normal scalar column. In a related aspect, set of sparse columns in a table is represented as a single scalar representation that can be queried, inserted or updated similar to any other single scalar column. Accordingly, SQL server can introduce the notion of adding a column_set to a table. A column_set is, conceptually, a type of updatable, computed XML column that aggregates a set of underlying relational columns into a single XML representation.

In general, sparse columns (e.g., columns having a substantial percentage of rows with null values) facilitate an efficient storage/retrieval of sparsely populated columns, wherein additional storage attributes can be specified during column creation. Such further permits a storage layer in a database engine to optimize the storage for such columns by storing only non-null values for that column in the data pages. As such, the Column_Set of the subject innovation can also treat the (sparse) columns as a group for retrieval/update. This represents a logical grouping of columns that provides a scalar representation for values coming out of such group of columns.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
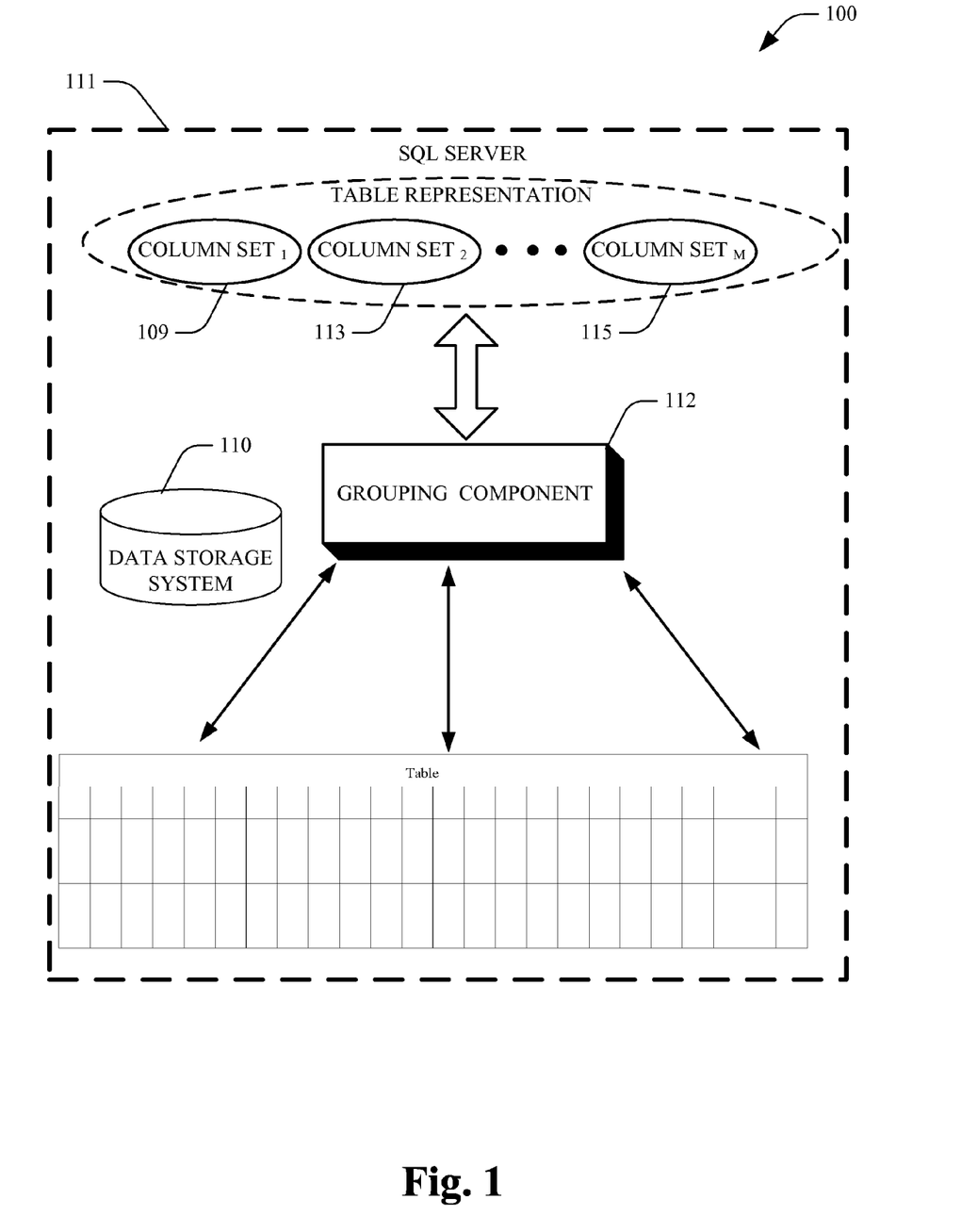
FIG. 1 illustrates a block diagram of a system that supplies an enhancement to a Structured Query Language (SQL) in form of a grouping component in accordance with an aspect of the subject innovation.

FIG. 1 illustrates a block diagram of a system 100 that groups atomic scalar values recognized by a database such as columns into sets (e.g., column sets)—via a grouping component 112, according to an aspect of the subject innovation. Each of the column sets 109, 113, 115 (1 to M, where M is an integer) can be treated as a single entity on a client side, for example. As illustrated, the SQL server 111 can associate with a data storage system 110, wherein such data storage system 110 can be a complex model based at least upon a database structure, wherein an item, a sub-item, a property, and a relationship are defined to allow representation of information within a data storage system as instances of complex types. For example, the data storage system 110 can employ a set of basic building blocks for creating and managing rich, persisted objects and links between objects. An item can be defined as the smallest unit of consistency within the data storage system 110, which can be independently secured, serialized, synchronized, copied, backup/restored, and the like. Such item can include an instance of a type, wherein all items in the data storage system 110 can be stored in a single global extent of items. The data storage system 110 can be based upon at least one item and/or a container structure. Moreover, the data storage system 110 can be a storage platform exposing rich metadata that is buried in files as items. The data storage system 110 can include a database, to support the above discussed functionality, wherein any suitable characteristics and/or attributes can be implemented. Furthermore, the data storage system 110 can employ a container hierarchical structure, wherein a container is an item that can contain at least one other item. The containment concept can be implemented via a container ID property inside the associated class. A store can also be a container such that the store can be a physical organizational and manageability unit. In addition, the store represents a root container for a tree of containers within the hierarchical structure. As such, the grouping component 112 can create a logical representation for column groupings, which are accessible by a single I/O and can be co-located (e.g., substantially close or compact) in terms of storage location such as the data storage system 110.

Figure 2:
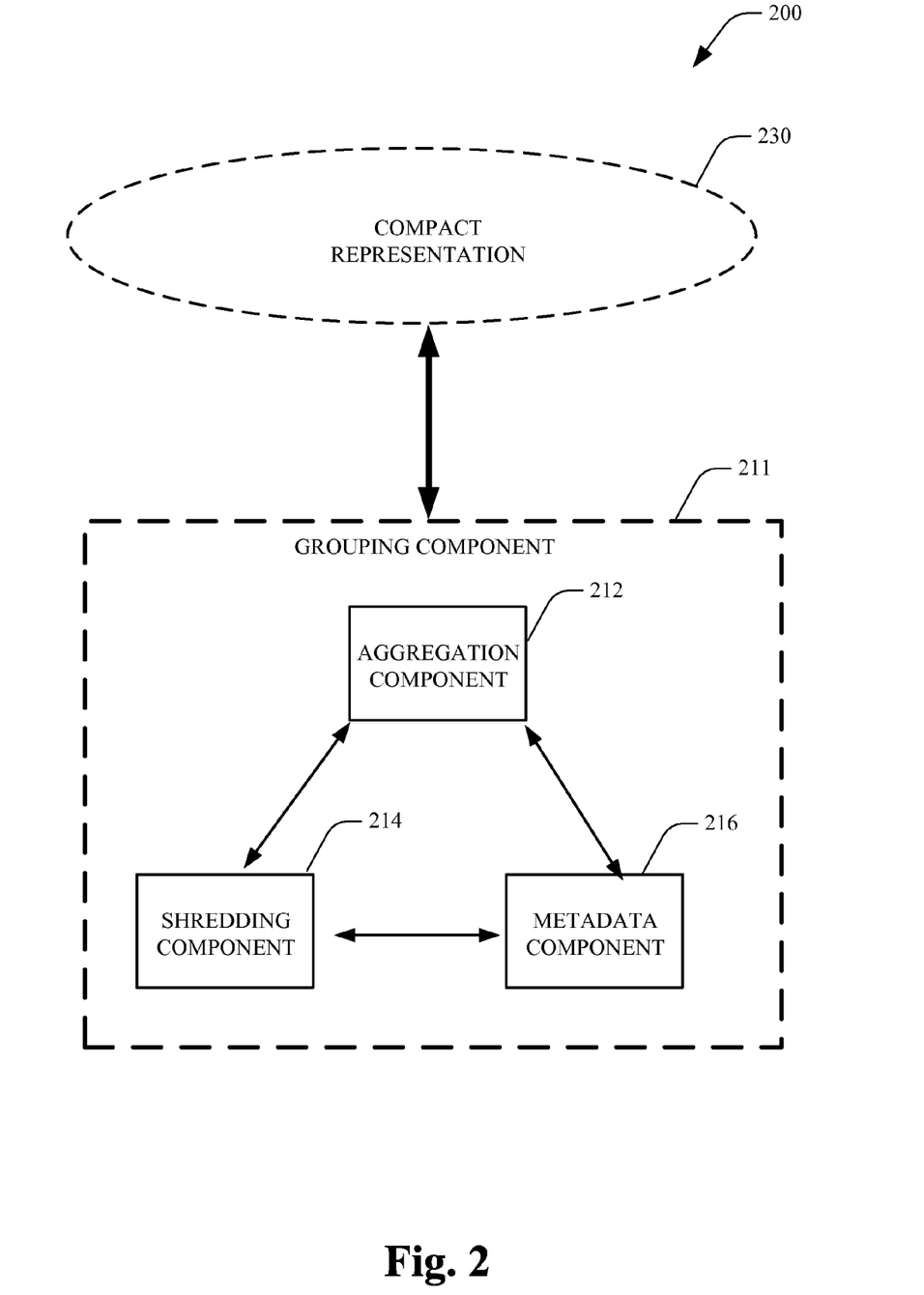
FIG. 2 illustrates a further exemplary aspect of a grouping component according to an aspect of the subject innovation.

FIG. 2 illustrates a further exemplary aspect of a system 200 that implements a grouping component 211 according to an aspect of the subject innovation. The grouping component 211 can further include an aggregation component 212, a shredding component 214, and a metadata component 216. The aggregation component 212 can obtain one or more columns and create a scalar representation therefrom. Likewise, the shredding component 214 can take an incoming scalar representation and break it up into one or more columns. The shredding component 214 and the aggregation component 212 further employ the metadata component 216 to identify columns that are part of the column set, and output a compact representation 230 thereof. Accordingly, the metadata component 216 can track which columns are part of which set (e.g., verifying type of properties and their existence) and the shredding component 214 facilitates processes for shredding columns into a grouping set and from the grouping set into underlying individual columns—wherein the metadata component 216 identifies columns that are part of the column set. Accordingly, two processes are facilitated, one from shredded column in to the grouping set and the other from the grouping set into the underlying individual columns.

For example, for creation of a column set one example can include creation of a table wherein:

```
. CREATE TABLE
  [ database_name . [ schema_name ] . | schema_name . ] table_name
    ( { <column_definition> | <computed_column_definition> |
        <column_set_definition }
...
...
<column_set_definition> ::=
    column_name <datatype>
    COLUMN_SET <List of member Columns>
As scuh, an example can include:
CREATE TABLE t (
    id int,
    sparseProp1 int SPARSE,
    sparseProp2 nvarchar(128) SPARSE,
    sparsePropertySet XML COLUMN_SET FOR (sparseProp1,
    sparseProp2);
```

During a select operation on a table containing a column set, behavior of the column set column is to aggregate all the non-null columns that are the members of that column set in a row into an XML fragment and produce a computed XML column value. Any XQuery operation that can be done on a normal XML column can also be done on the sparse_column_set column also.

For example

TABLE I

SELECT * from Sparse_Table;

| ID | sparsePropertySet |
|---|---|
| 1 | <sparseProp1>10</sparseProp1> |
| 2 | <sparseProp1>20</sparseProp1> |
| 3 | <sparseProp2>Title1</sparseProp2> |
| 4 | <sparseProp2>Title2</sparseProp2> |
| 5 | <sparseProp1>30</sparseProp1><sparseProp2>Title3</sparseProp2> |

Similarly, Columnset column can be employed in an update/insert statement to update/insert values for its member columns by using an XML format. Underlying Database Engine can be responsible for decomposing this XML fragment and storing the values for its individual columns.

Figure 3:
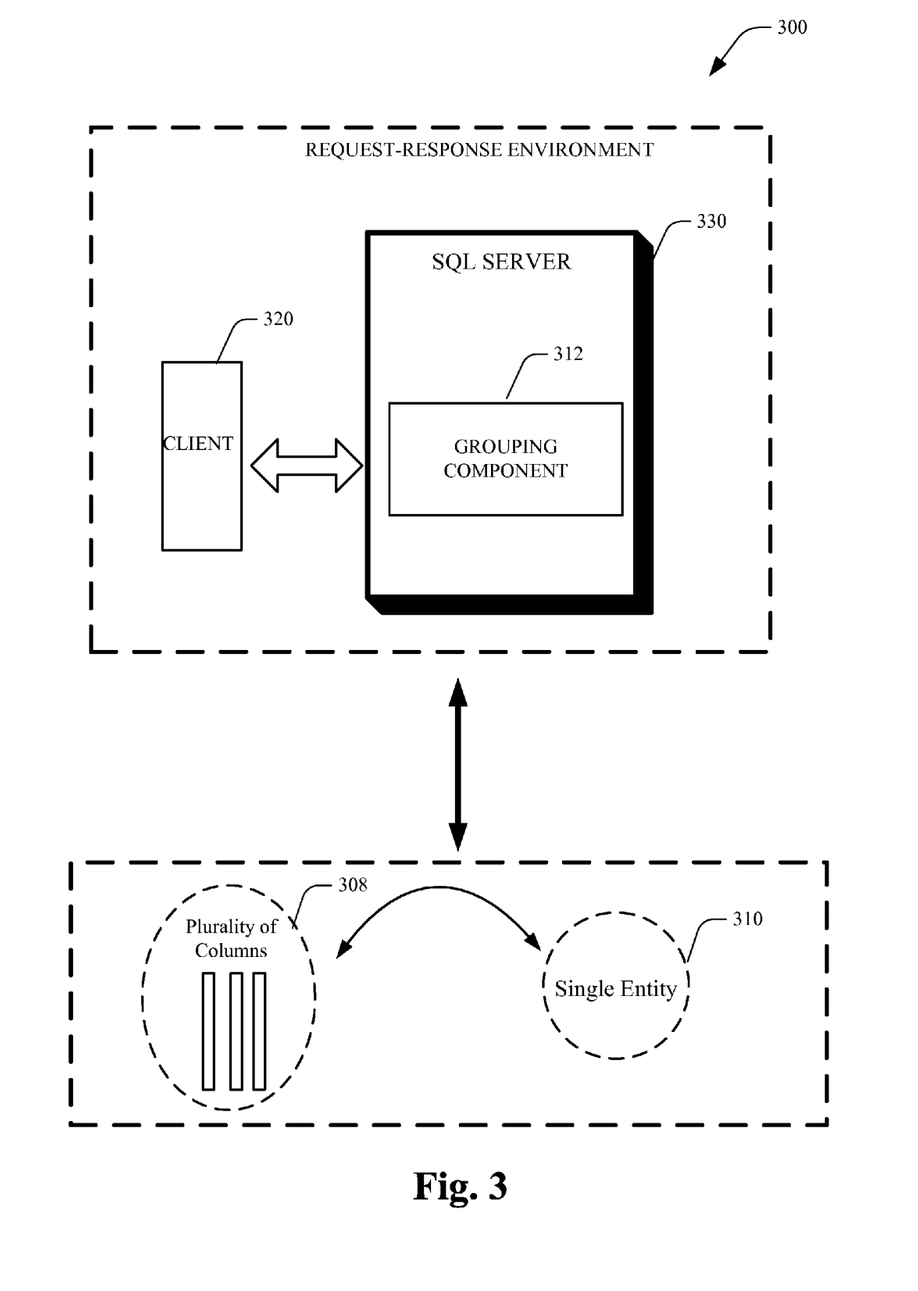
FIG. 3 illustrates a system that facilitates representation and grouping of a plurality of columns according to an aspect of the subject innovation.

FIG. 3 illustrates a system 300 that facilitates representation and grouping of a plurality of columns 308 according to an aspect of the subject innovation. The grouping component 312 enables representing a compact encoding of data within a column set, which can be treated as a single entity 310 by the client 320. The system 300 can further include an input component, a query manager, and an output component (not shown). For example, the input component can receive queries, wherein such queries can be initiated from essentially any database programming language such as SQL, and directed over a data repository that includes one or more databases, tables, contextual information, and the like. The query manager can further augment the SQL 330 to incorporate the grouping component 312 therein. As explained earlier, notion of a column set of the subject innovation represents a conceptual/logical grouping of a number of columns in a relational table. The column Set provides a scalar representation for such a logical group and can be queried and manipulated as a set similar to a single scalar column. Moreover, the subject innovation supplies applications/users a scalar representation for grouping related columns together by extending SQL data definition language, and facilities querying and manipulating the column set as a group—while still maintaining the flexibility accessing underlying individual columns as needed. For example, a simple representation for a column set in SQL data definition language can include: <column set name> <scalar data type> COLUMN SET FOR (<list of member columns in the table>

Column set can be queried and manipulated using SQL query and data manipulation language similar to manipulating a normal scalar column. Moreover, the set of sparse columns in a table can be represented, as a single scalar representation that can be queried, inserted or updated similar to any other single scalar column. Accordingly, the SQL server 330 can introduce the notion of adding a column_set to a table. As explained earlier, a column_set is, conceptually, a type of updatable, computed XML column that aggregates a set of underlying relational columns into a single XML representation. In general, sparse columns (e.g., columns having a substantial percentage of rows with null values) facilitate an efficient storage/retrieval of sparsely populated columns, wherein additional storage attributes can be specified during column creation. Such further permits a storage layer in a database engine to optimize the storage for such columns by storing only non-null values for that column in the data pages. As such, the Column_Set of the subject innovation can also treat the columns (e.g. sparse columns) as a group for retrieval/update. This represents a logical grouping of columns that provides a scalar representation for values coming out of such group of columns.

A typical usage for sparse columns can relate to storage for varying sets of properties associated with specific items/records in a table. In general, a user querying for a set of records from the table likely desires to obtain a set of non-null properties associated with each of such records as a group. Since such property set can contain varying memberships of sparse columns based on whether a specific sparse property has a non-null value for a given record, it is convenient for the user to address the set of sparse columns in a table as single scalar representation that can be queried, inserted or updated similar to any other single scalar column. As explained earlier, the SQL server can supply a column_set to a table, wherein the column_set is, conceptually, a type of updatable, computed XML column that aggregates a set of underlying relational columns into a single XML representation. For example, such column can be created as:

Create Table

```
CREATE TABLE
  [ database_name . [ schema_name ] . | schema_name . ] table_name
    ( { <column_definition> | <computed_column_definition> |
        <column_set_definition }
...
...
<column_set_definition> ::=
    column_name XML COLUMN_SET FOR
    ALL_SPARSE_COLUMNS
```

In another example a table can be created as:

```
CREATE TABLE t (
    id int,
    sparseProp1 int SPARSE,
    sparseProp2 nvarchar(128) SPARSE,
    sparsePropertySet XML COLUMN_SET FOR
    ALL_SPARSE_COLUMNS);
```

Moreover, in a related aspect an "Alter Table" statement can be employed to add a column_set to an existing table.

```
ALTER TABLE
        [ database_name . [ schema_name ] . | schema_name . ]
    table_name
    {
    ...
    ...
    | [ WITH { CHECK | NOCHECK } ] ADD
        {
            <column_definition>
         | <computed_column_definition>
         | <table_constraint>
         | <column_set_definition
        }
```

As an additional example, where the user/application desires to manipulate the sparse columns as a set, such user can employ the "sparse_column_set" column for that operation. When used in DML statements, the value for "sparse_column_set" column can be shredded into appropriate underlying sparse columns (as dictated by the XML format in the specified value). Use of a column_set column in an insert, update or delete operation can further indicate the operation is applied on the whole set.

Likewise, inserting a row using an XML value for column_set column can insert the row into the table by shredding the XML into appropriate underlying columns in the group and inserting those values. Columns in the column_set that are not specified in the XML fragment can further be assigned NULL values.

If an insert operation is specified without explicit column list, the implied column list is the same as the set of columns retrieved for a "select *" operation on that table.

```
Create table (id int, c1 int sparse, c2 int sparse, cs xml column_set
    for all_sparse_columns);
    -- the implicit columns for the insert list are id, cs
    Insert into t values (1, '<c1>11</c1><c2>22</c2>')
```

Similarly, for the update operation, Column_set columns can be updated using UPDATE statements by assigning the column_set column an XML fragment. Semantics of updating a column_set using update statement is similar to replacing the values for the columns in the column group with the corresponding values provided in the XML fragment, for example. Likewise, columns in the column_set that lack a value specified in the XML fragment can be assigned NULL value. Moreover, if a NULL/empty XML string value is specified as input for the sparse_column_set in an insert OR update operation, all underlying sparse columns can be set to NULL value.

In some cases it can be desirable to update only the specified set of columns in the column_set without replacing the values of other columns in the column_set with NULL values. For such kind of semantics a merge( ) function can be employed to merge.
Update sparse_table SET sparsePropertySet.merge(@xml);
where the merge function is:
<column_set column>.merge(<xml_fragment>)

This merge function can update the columns in column_set with the corresponding values from the input xml fragment, wherein other columns in the column_set are typically not changed. Moreover, if a NULL/empty XML string value is specified as input for the sparse_column_set in a merge operation, none of sparse columns in the table are changed.

According, to a further aspect of the subject innovation, views can further be defined on columns sets, wherein the views, column_set can appear similar to any other XML column. Likewise, updateable views can update a column_set column in the underlying table using appropriate XML value for the column_set, similar to updating the column_set on the base table.

Figure 4:
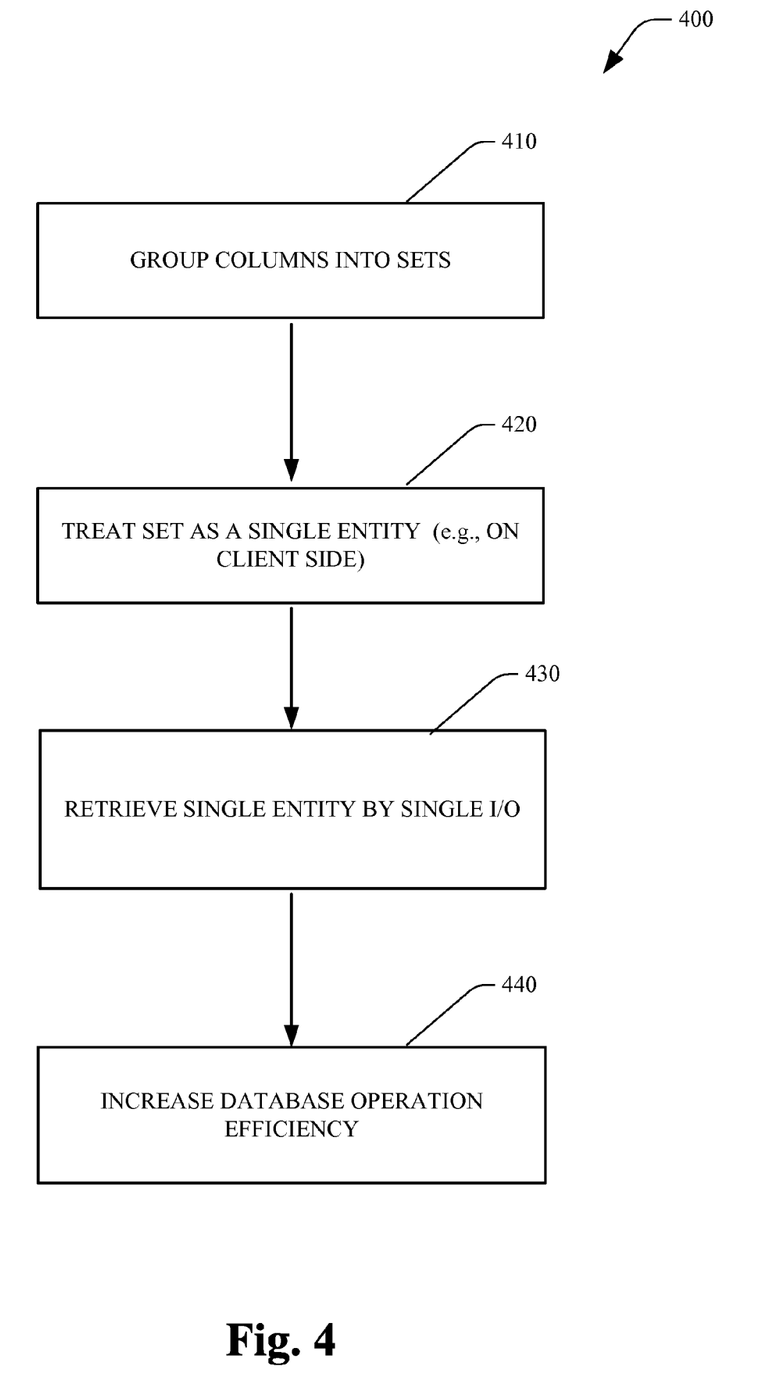
FIG. 4 illustrates a related methodology of grouping columns into sets in accordance with an aspect of the subject innovation.

FIG. 4 illustrates a related methodology 400 of grouping columns into sets in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 410 a plurality of columns can be grouped into sets, wherein a set can represent a logical representation for column groupings at 420. Subsequently and at 430, a set can be accessible by a single I/O at 430 and can be co-located (e.g., substantially close or compact) in terms of storage location. Moreover, the column set can further resemble a simple compact representation, such as a string representation, a binary representation, a single binary scalar, and the like for a set of columns—hence efficiency is increased for database operations (e.g., insert, update, select, and the like) at 440.

Figure 5:
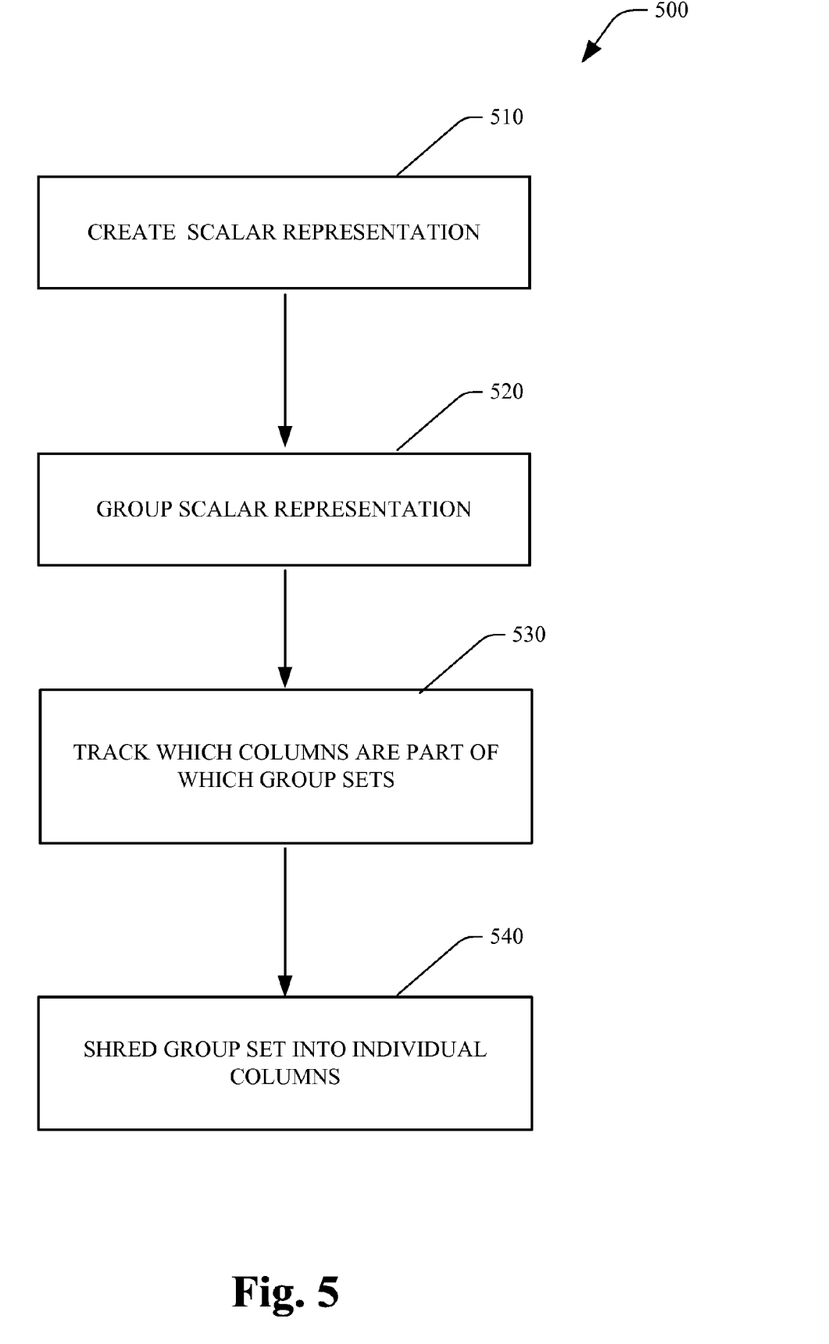
FIG. 5 illustrates an exemplary methodology of aggregating columns into sets and/or shredding sets into columns in accordance with a particular aspect of the subject innovation.

FIG. 5 illustrates a related methodology 500 of aggregating columns into sets and/or shredding sets into columns. Initially and 510 scalar representations can be created, wherein one or more columns are aggregated for a representation thereof. Next, and at 520 such scalar representation can be grouped as column sets, wherein columns can be tracked at 530 as part of group sets. Moreover, group sets can be shredded at 540 into individual columns wherein the two processes of aggregation and shredding occurs as part of interaction with queries and database servers (e.g., updates, inserts, and the like.)

Figure 6:
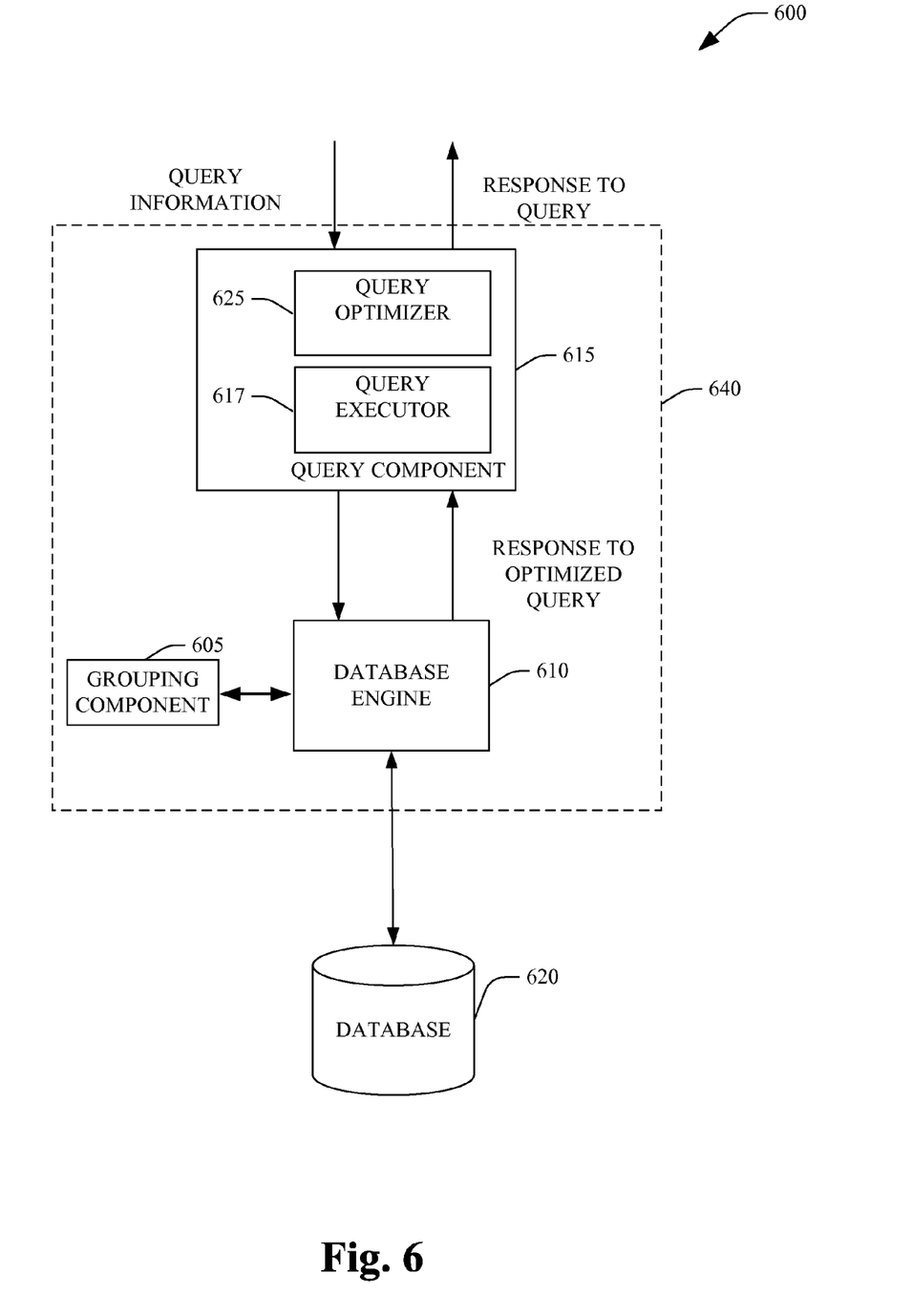
FIG. 6 illustrates a system that facilitates representing column groups as a single entity on a client side according to an aspect of the subject innovation.

FIG. 6 illustrates a system 600 that facilitates representing column groups as a single entity on a client side according to an aspect of the subject innovation. The system 600 includes a database engine 610, a database 620, and, a query component 615. The query component 615 can include a query optimizer 625 and a query executor 617. The database 620 optionally, the query component 615 and the database engine 610 can form a query database engine 640.

The table(s) of the database 620 can be employed by the system(s) 600, so that information can be reasoned about and searched using standard relational technique(s). The system 600 can enhance file system by setting interesting column sets (e.g., non-null), which can then be selected for a data representation thereof as a single entity to other applications. When a query is posed to the query component 615, the query optimizer 625 can determine the "best way" to answer that query ("optimization"). For example, the query component 615 can employ a cost-based optimization strategy whereby the least expensive way to execute the query is chosen to be the plan. The query component 615 can employ state of the art technologies in enumerating possible plans and pruning out the expensive ones. Indexes on tables play a significant role in reducing the cost of access to data in these tables. It is to be appreciated that any type of optimization process suitable for carrying out the subject innovation can be employed and all such types of optimization technologies are intended to fall within the scope of the subject innovation. The grouping component 605 can create a logical representation for column groupings, which are accessible by a single I/O and can be co-located (e.g., substantially close or compact) in terms of storage location. Moreover, the column set can further resemble a simple compact representation, such as a string representation, a binary representation, a single binary scalar, and the like for a set of columns—hence efficiency can be increased for database operations (e.g., insert, update, select, and the like.)

Figure 7:
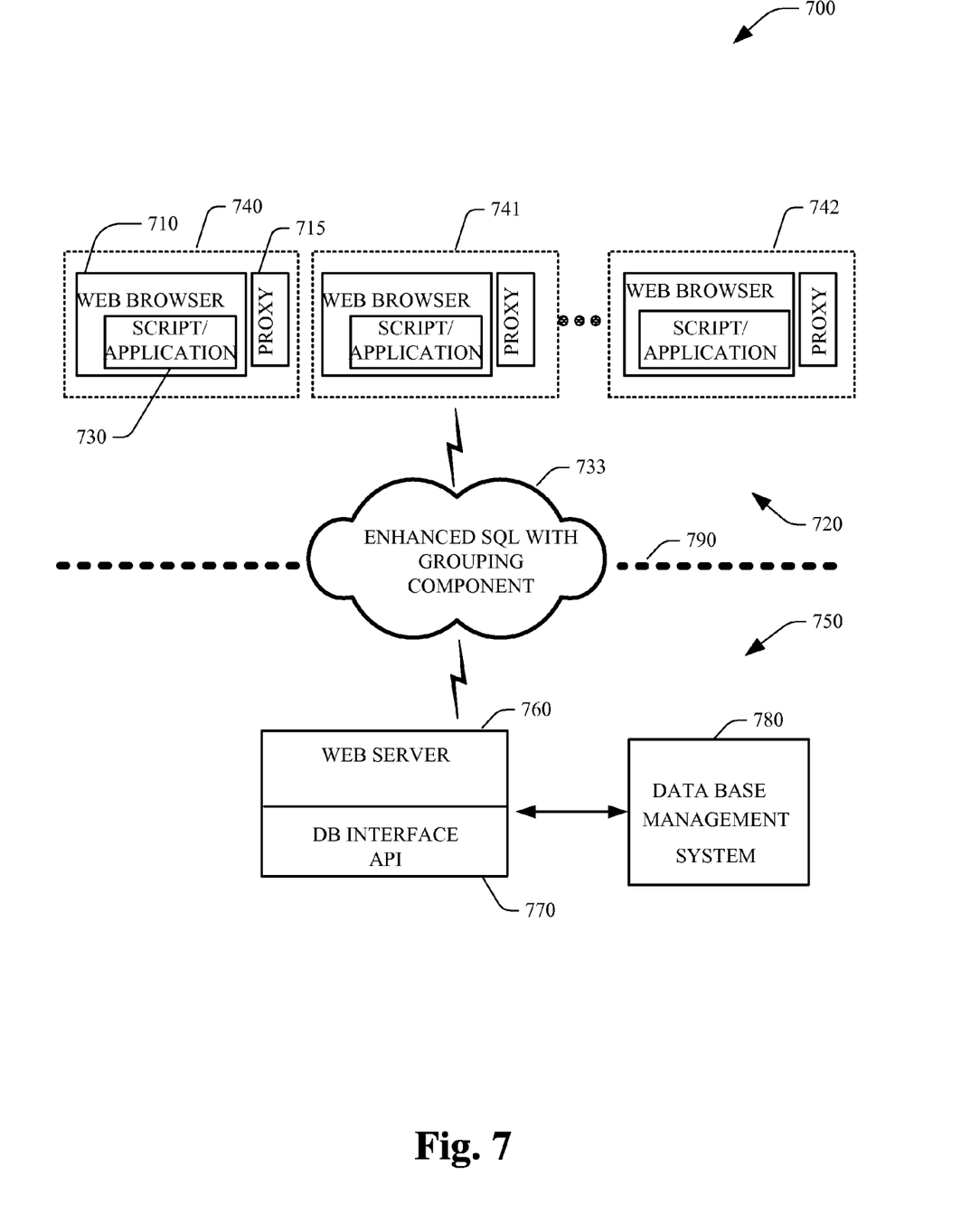
FIG. 7 illustrates a system that implements an enhanced SQL that enables the client to treat a plurality of columns as a single entity when interacting with the server.

FIG. 7 illustrates a system 700 that implements an enhanced SQL 733 that enables the client 720 to treat a plurality of columns as a single entity when interacting with the server 750, wherein running on the client 720 is a client process, for example, a web browser 710. Likewise, running on the server 750 is a corresponding server process, for example, a web server 760. In addition, embedded in the Web Browser 710 can be a script or application 730, and running within the run-time environment 740 of the client computer 720, can exist a proxy 715 for packaging and unpacking data packets formatted in accordance with various aspects of the present invention. Communicating with the server 750 is a database management system (DBMS) 780, which manages access to a database (not shown). The DBMS 780 and the database (not shown) can be located in the server itself, or can be located remotely on a remote database server (not shown). Running on the Web server 760 is a database interface Applications Programming Interface (API) 770, which provides access to the DBMS 780. The client computer 720 and the server computer 750 can communicate with each other through a network 790. When the client process, e.g., the Web browser 710, requests data from a database, the script or application 730 issues a query, which is sent across the network (e.g. internet) 790 to the server computer 750, where it is interpreted by the server process, e.g., the Web server 760. As explained earlier, the client's 720 request to server 750 can contain multiple commands, and a response from server 750 can return a plurality of result sets. Responses to client commands that are returned can be self-describing, and record oriented; (e.g. the data streams can describe names, types and optional descriptions of rows being returned.) On the client side 720 the data can be a login record, or a Structured Query Language (SQL) command being in a language that the server side 750 can accept, a SQL command followed by its associated binary data (e.g. the data for a bulk copy command), or an attention signal. When a connection is desired, the client 720 can send a login data stream to the server. Even though the client 720 can have more than one connection to the server 450, each connection path can be established separately and in the same manner.

Once the server 750 has received the login record from the client 720 it will notify the client that it has either accepted or rejected the connection request. Likewise to send SQL command or batch of SQL commands; then the SQL command (e.g. represented by a Unicode format) can be copied into the data section of a buffer and then sent to the SQL Server side 720. A SQL batch may span more than one buffer. In addition, various Open Data Base Connectivity (ODBC) routines can cause SQL command to be placed into a client message buffer, or can cause the message buffer to be sent to the server.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 8:
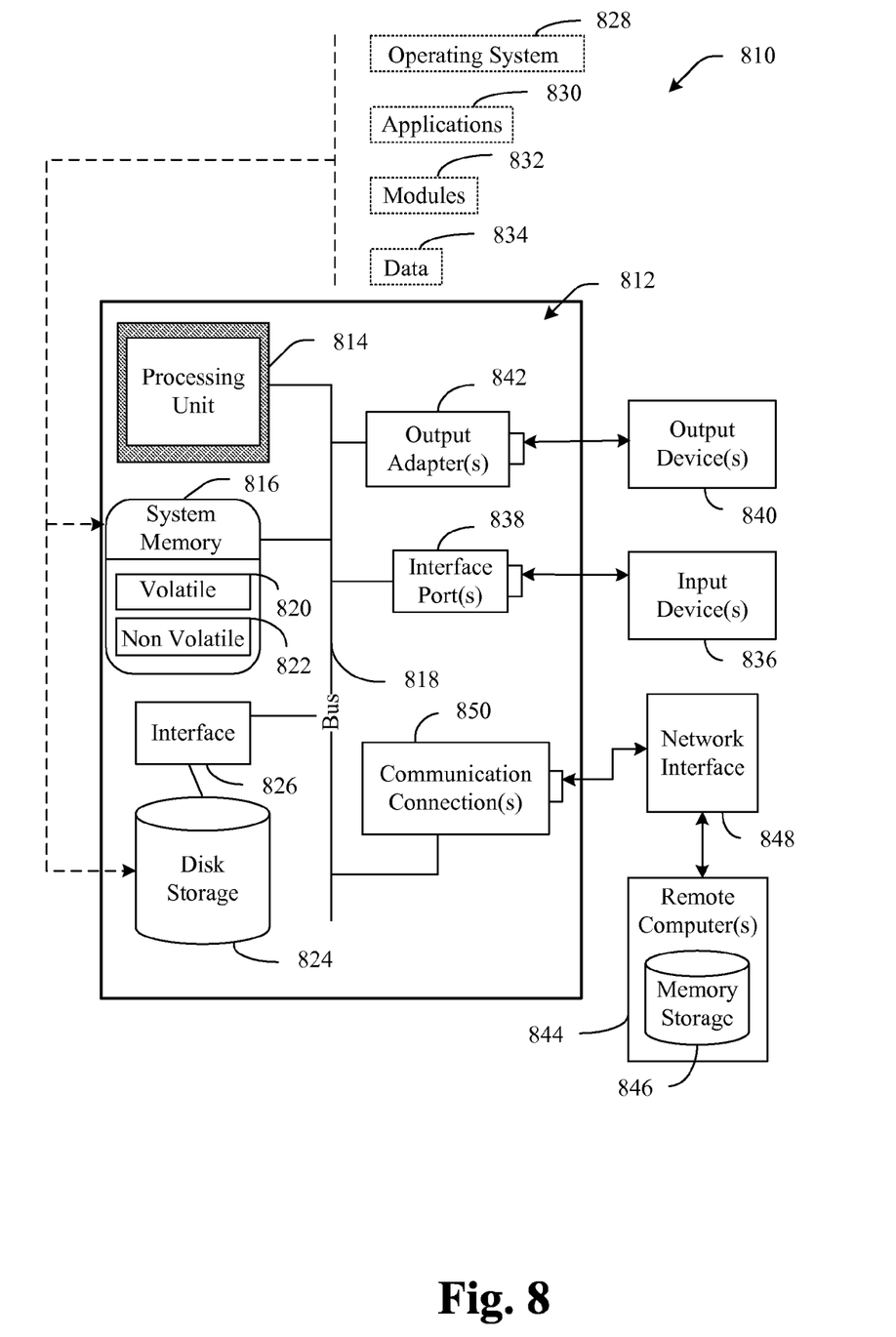
FIG. 8 illustrates an exemplary environment for implementing various aspects of the subject innovation.
Figure 9:
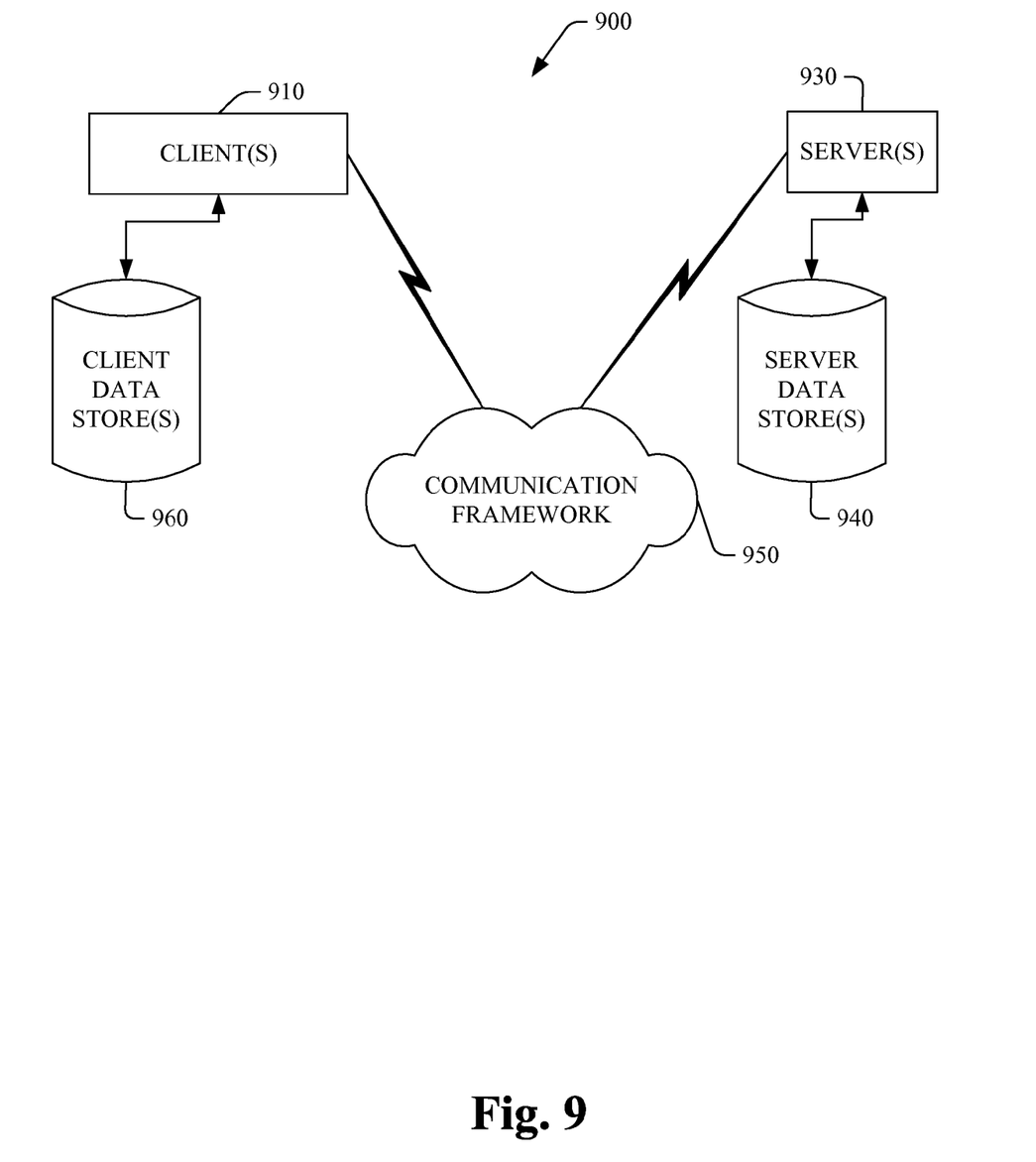
FIG. 9 is a schematic block diagram of a sample-computing environment that can be employed for an enhanced SQL according to an aspect of the subject innovation.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 8, an exemplary environment 810 for implementing various aspects of the subject innovation is described that includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates a disk storage 824, wherein such disk storage 824 includes, but is not limited to, devices like a magnetic disk drive, floppy disk drive, tape drive, Jaz drive, Zip drive, LS-60 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 818, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed for implementing an enhanced SQL with a grouping component, according to an aspect of the subject innovation. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system comprising at least one processor coupled to at least one computer-readable storage medium storing instructions executable by the at least one processor to implement:

a grouping component configured to, in response to a definition in a Structured Query Language (SQL) definition language, group a plurality of columns associated with a table in a database into a column set configured as an updatable eXtended Markup Language (XML) column that aggregates a set of relational columns into a single XML representation, the plurality of columns each being columns of a first table, the updatable XML column being co-located, the grouping component being further configured to, when a first column of the plurality of columns includes a first non-null value in a first row and a second column of the plurality of columns includes a second non-null value in the first row, include a combination of the first non-null value and the second non-null value as an entry in a corresponding first row of the updatable XML column, the grouping component being further configured to, when the first column of the plurality of columns includes the first non-null value in the first row and the second column of the plurality of columns includes a null value in the first row, include the first non-null value as the entry in the corresponding first row of the updatable XML column, and the grouping component being further configured to, when the first column of the plurality of columns includes the null value in the first row and the second column of the plurality of columns includes the second non-null value in the first row, include the second non-null value as the entry in the corresponding first row of the updatable XML column;

the grouping component including
an aggregation component configured to create a scalar representation of the plurality of columns at least partly in terms of the column set, and
a shredding component configured to break the scalar representation into individual columns.

2. The computer-implemented system of claim 1, wherein the database is accessible with a Structured Query Language (SQL) for a query of the column set.

3. The computer-implemented system of claim 1, further comprising a merge function configured to update specified columns in the column set with corresponding values in an XML fragment while leaving other columns of the column set unchanged.

4. The computer-implemented system of claim 1, wherein the definition includes a column set name, a scalar data type, and a list of member columns in the table.

5. The computer-implemented system of claim 1, the grouping component further comprising a metadata component configured to track identity of columns that are part of the column set.

6. The computer-implemented system of claim 2, wherein the grouping component is configured to group related columns by extending the SQL data definition language.

7. The computer-implemented system of claim 1, further comprising updatable XML documents to generate the column set.

8. The computer-implemented system of claim 1, wherein the column set has at least one of a string representation, a binary representation, or a single binary scalar representation.

9. The computer-implemented system of claim 1, wherein the plurality of columns include sparse columns having a substantial percentage of rows with null values.

10. A computer-implemented method comprising:
based on an SQL language definition identifying at least a plurality of columns, forming a column set as a scalar representation of the plurality of columns, at least in part by aggregating non-null columns that are members of the column set into an XML fragment, the plurality of columns each being columns of a first table,
forming the column set including:
when a first column of the plurality of columns includes a first non-null value in a first row and a second column of the plurality of columns includes a second non-null value in the first row, including a combination of the first non-null value and the second non-null value as an entry in a corresponding first row of the XML fragment,
when the first column of the plurality of columns includes the first non-null value in the first row and the second column of the plurality of columns includes a null value in the first row, including the first non-null value as the entry in the corresponding first row of the XML fragment, and
when the first column of the plurality of columns includes the null value in the first row and the second column of the plurality of columns includes the second non-null value in the first row, including the second non-null value as the entry in the corresponding first row of the XML fragment; and
based on an interaction between a query and a database storing the column set, breaking the column set down into individual columns.

11. The computer-implemented method of claim 10, further comprising analyzing at least one of a schema or metadata associated with the plurality of columns to match column groups together.

12. The computer-implemented method of claim 10, further comprising generating the column set via XML.

13. The computer-implemented method of claim 10, further comprising querying the column set via SQL.

14. The computer-implemented method of claim 10, further comprising representing a set of sparse columns as a single value.

15. The computer-implemented method of claim 14, further comprising optimizing storage by storing non-null values.

16. The computer-implemented method of claim 10, further comprising adding the column set to a table.

17. The computer-implemented method of claim 10, further comprising applying at least one of an insert, update or delete operation to the plurality of columns by applying the at least one operation to the column set.

18. The computer-implemented method of claim 10, further comprising representing the column set in the SQL language definition in terms of a column set name, a scalar data type, and a list of member columns.

19. The computer-implemented method of claim 10, further comprising treating the column set as a single entity.

20. A computer-readable medium storage medium storing instructions executable by a computing device to perform operations comprising:
based on an SQL language definition, aggregating a plurality of relational columns in a database to form an XML representation capable of being manipulated as a single logical entity, the plurality of relational columns each being columns of a first table aggregating including:

when a first column of the plurality of relational columns includes a first non-null value in a first row and a second column of the plurality of relational columns includes a second non-null value in the first row, including a combination of the first non-null value and the second non-null value as an entry in a corresponding first row of the XML representation, when the first column of the plurality of relational columns includes the first non-null value in the first row and the second column of the plurality of relational columns includes a null value in the first row, including the first non-null value as the entry in the corresponding first row of the XML representation, and when the first column of the plurality of relational columns includes the null value in the first row and the second column of the plurality of relational columns includes the second non-null value in the first row, including the second non-null value as the entry in the corresponding first row of the XML representation;

retrieving the single logical entity in response to a query issued in a Structured Query Language; and shredding the single logical entity into individual columns based on the query.

* * * * *